3,335,794
SECONDARY RECOVERY METHOD WITH SURFACTANT IN FRACTURING FLUID
Donald C. Bond, Lakewood, Crystal Lake, Ill., assignor to Union Oil Company of California, Los Angeles, Calif., a corporation of California
No Drawing. Filed Aug. 19, 1965, Ser. No. 481,058
16 Claims. (Cl. 166—9)

The present invention is directed to a method for recovering oil from subterranean oil-bearing formations. More particularly, the invention relates to a combination fracturing and secondary recovery method wherein a surfactant from which foam is generated is disposed in the formation during the fracturing portion of the overall process. The surfactant, in a form which permits dispersion thereof in the formation away from the injection well, is incorporated in the fracturing fluid whereby, it is displaced a desired distance away from the injection well area. The subsequent injection of a gasiform fluid will thus contact the surfactant and generate a foam a short distance from the injection well thereby permitting the injection of driving fluids at lower pressures and higher injection rates.

In recent years one of the most commonly employed methods of treating earth formations to facilitate increased oil recovery therefrom is hydraulic fracturing. As is well known, hydraulic fracturing of earth formations is usually accomplished by injecting into the well a fluid generally of a viscous nature at a rate sufficient to build up within the well pressure greater than that which the formation can withstand, thereby causing the formation to rupture. After the initial breakdown of the formation the fracturing fluid is generally continued to be forced into the induced cracks so as to extend the fracture for a substantial distance into the formation. After substantial fracturing has occurred, the formation may then be subjected to the injection of various secondary recovery fluids wherein the driving fluids are driven from the injection well to the producing well. In many instances after the fracturing process has been terminated the fractures produced in the earth formations tend to close due to the weight of the overburden. In order to keep the fracture open granular solids, such as sand, are usually suspended in the fracturing fluid and injected into the well therewith. The granular solids upon being carried into the fracture act as props and hold open the fracture after the injection pressure is released. Thereafter, the formation is capable of receiving driving fluids at increased rates and lower pressures thereby making it more practical and economical to produce the formation.

Also, as of late, the idea of utilizing foam in and of itself or in conjunction with other well-known driving fluids and even in conjunction with hydrocarbon solvents and oxygenated hydrocarbons in a modified miscible phase displacement process has also been suggested. However, it has been found that the formation of a foam bank or banks in the earth immediately adjacent to the injection well area produces a plugging or blocking effect which makes the injection of subsequent driving fluids difficult. It has been determined that about 30% of the total pressure drop from an injection well to a production well occurs within about 6% of the distance between two wells. Thus, if a surfactant can be displaced a distance equal to at least 3 to 6% of the distance between wells, the subsequent injection of driving fluid is readily facilitated.

In essence, therefore, the preferred embodiments of the invention reside in the disposition of a surfactant in a form which will permit displacement thereof in the formation to a distance away from the immediate vicinity of the injection well during the fracturing process so that a gas subsequently injected to contact the surfactant will not cause the generation of foam within the immediate vicinity of the injection well. Thereafter liquid or gasiform driving fluids or combinations thereof may be used to produce the formation. Thus the surfactant may be in the form of spheres, grains, pellets or micro- and macro-capsules.

The types of fracturing liquids which may be utilized in the practice of the present invention may be aqueous or oil derived. When water is employed as the fracturing liquid or suspending medium it may be either fresh water or a brine. Ordinarily it is preferred to employ a brine such as sodium chloride or calcium chloride which contains from about 1 to about 5% of either the sodium chloride or the calcium chloride. When a hydrocarbon-derived fracturing liquid or carrier medium is employed, it suitably should be one having a viscosity from about 1.5 to about 400 centipoises at 60° F. and boiling in the range from about 100° to about 800° F. Illustrative of the liquid hydrocarbons may be mentioned the gasoline, kerosene, diesel oil and gas-oil hydrocarbons and the individual components thereof. Kerosene, diesel oil and crude oils are preferentially used. While liquid hydrocarbon fractions obtained from crude petroleum and the like may be satisfactory, under some instances it may be desirable to employ pure hydrocarbons boiling within the range of about 100° to about 800° F.

In carrying out the fracturing portion of the hereindisclosed process, it is preferred to select a form of surfactant which is insoluble in the particular fracturing liquid or career liquid utilized. For instance, if a hydrocarbon or petroleum-derived fracturing liquid is utilized, it is desirable to select a water-soluble surfactant or a surfactant encapsulated in a water-soluble material which may be incorporated in the oil-base fracturing liquid. On the other hand where the fracturing liquid is aqueous it is preferred to select an oil-soluble surfactant or a surfactant encapsulated in an oil-soluble material. Thus, the incompatibility between the foaming agent or surfactant and fracturing liquid or carrying fluid will prevent the surfactant from dissolving in the fracturing liquid to produce a situation whereby the subsequent injection of a gasiform fluid (to generate foam in the formation) will contact the dissolved surfactant adjacent to or near the injection well. In those instances where this incompatability between surfactant form and fracturing liquid does not exist it will be necessary to inject a slug of surfactant-soluble liquid prior to the injection of the gasiform fluid (for foam generation) so as to move the dispersed surfactant away from the immediate area of the formation in proximity to the injection well. In other instances where the surfactant is sparingly soluble the liquid slug may not be necessary. Preferably the surfactants utilized in this invention are those which form a stable foam in the formation when contacted intimately with a liquid and a gas. The surfactants may be either liquid, granular or pastes and may be anionic, cationic or nonionic so long as they meet the basic prerequisites stated above and may be selected from commercially published lists which describe their properties. Information concerning such surfactants may be found in Encyclopedia of Surface Active Agents, by J. P. Sisley, translated from the French by P. J. Wood, Chemical Publishing Co., New York, 1952. Other nonlimiting examples of surfactants or surface acitve agents which may be used in the practice of this invention are:

| Trade name: | Chemical name |
|---|---|
| Aerosol C-61 | Ethanolated alkyl guanidine-amine complex. |
| Aerosol OS | Isopropyl naphthalene sodium sulfonate. |
| Aerosol OT | Dioctyl sodium sulfosuccinate. |
| Arquad 2C | Dicoco dimethyl ammonium chloride. |
| Arquad T | Tallow trimethyl ammonium chloride. |
| Duponol EP | Fatty alcohol alkylolamine sulfate. |
| Duponol RA | Modified ether alcohol sulfate sodium salt. |
| Duponol WAQ | Sodium lauryl alcohol sulfate. |
| Ethomid HT-60 | Condensation of hydrogenated tallow amide and ethylene oxide. |
| Hyonic FA-75 | Modified fatty alkylolamide. |
| Miranol HM Concentrate | Ethylene cyclomido 1-lauryl, 2-hydroxy ethylene Na alcoholate, methylene Na carboxylate. |
| Miranol MM Concentrate | Same as Miranol HM except myristyl group is substituted for lauryl group. |
| Nacconal NR | Alkyl aryl sulfonate. |
| Ninol AA62 | Lauric diethanolamide. |
| Ninol 1001 | Fatty acid alkanolamide. |
| Petrowet R | Sodium alkyl sulfonate. |
| Pluronic L44 | Condensation product of ethylene oxide with propylene glycol. |
| Product BCO | C-cetyl betaine. |
| Renex 650 | Polyoxyethylene alkyl aryl ether. |
| Sorbit AC | Sodium alkyl naphthalene sulfonate. |
| Sulfanol FAF | Sodium salt of fatty alcohols, sulfated. |
| Triton AS-30 | Sodium lauryl sulfate. |
| Triton X-100 | Alkyl aryl polyether alcohol. |
| Span 20 | Sorbitan monolaurate. |
| Span 40 | Sorbitan monopalmitate. |
| Span 85 | Sorbitan trioleate. |
| Tween 65 | Polyoxyethylene sorbitan tristearate. |
| Tween 81 | Polyoxyethylene sorbitan monooleate. |
| OPE 1 | Octylphenoxyethanols. |
| OPE 2 | Octylphenoxyethanols. |
| OPE 3 | Octylphenoxyethanols. |
| Triton GR-7 | Dioctyl sodium sulfosuccinate. |
| Triton B-1956 | Modified phthalic glycerol alkyl resin. |
| Triton X-45 | Isoctyl phenyl polyethoxy ethenol (about 5 ethoxy groups per molecule). |
| Trepenol WA | Sodium lauryl sulfate. |

Where the form of the surfactant is capsular, the size of the individual capsules may be either micro- or macro-, so long as they are capable of disposition in the formation. The encapsulating materials may be those already in use in the encapsulating art. Illustrative of some of these materials are: gelatin, albumen, alginates, such as sodium alginate, casein, agar-agar, starch, pectins, carboxy-methyl cellulose, Irish moss, gum arabic, etc. The methods by which compounds are encapsulated do not comprise a part of this invention and need not be dealt with herein since the prior art is already cognizant of the means and methods of encapsulation. Obviously, according to a preferred embodiment of the invention, an encapsulating material is selected which will be insoluble in the carrier or fracturing liquid. However, encapsulating materials may be selected which depend on pressure, temperature or time for disintegration thereby releasing or making available the encapsulated surfactant for foam generation.

The amount of surfactant or foaming agent incorporated in the facturing liquid should be that amount which will upon being contacted with a liquid and a gas generate a tenacious foam in amounts sufficient to substantially form a band or bank in the formation. The amount of surfactant will generally comprise about 8–20 wt. percent of the fracturing liquid with a range within 8–10 wt. percent generally being sufficient to achieve the formation of a tenacious foam bank within the earth.

In carrying out the fracturing operation in accordance with the invention, it will generally be desirable to employ solid granular materials commonly employed in the art as propping agents as a constituent of the fracturing fluid so that these materials may be carried into the formation fracture. These granular propping agents will settle out and be disposed within the formation fracture to maintain the fracture open after the fracturing pressure has been decreased. Such propping agents include, for example, sand, ceramic material, metal chips, wood chips, and the like. Where sand is used, this material can be from about 10–80 mesh preferably 20–60 mesh U.S. sieve. The amount of sand used will depend on various considerations such as the size of the fracturing treatment, the depth of the formation, the particular fracturing liquid, etc. and generally will vary between 3–50 wt. percent of the fracturing liquid with a general range of about 3–10 wt. percent being sufficient under most instances. Other known additives, such as fluid loss additives, i.e. alginates, may also be incorporated in the fracturing liquid. The size of the surfactant pellets, spheres, grains or capsules likewise will fall within the range of the size of the propping agent and ordinarily 40 mesh spheres, grains, capsules or pellets of surfactant will be found to be effective.

After the fracturing liquid has been injected along with the propping agent and foaming agent, under substantially high pressures and the formation adequately fractured, the next phase of the process or secondary recovery portion of the overall process may be commenced. This necessitates the injection of a sufficient quantity of gasiform fluid to contact the by this time dissolved or dispersed surfactant which is present in the formation. Depending upon the solubility of the surfactant spheres, grains, pellets or capsules, the surfactant spheres, grains, pellets or capsules will have dissolved in either predominantly oil-containing or water-containing strata and thus the subsequently injected gasiform fluid will generate a foam in either the oil strata or water strata or in those interstices of the formation in which the particular dissolved or dispersed surfactant is present. The gasiform fluid may be natural gas, air, nitrogen, flue gas, carbon dioxide, etc. and combinations and mixtures thereof. The amount of gas necessary to effectively foam the dissolved or dispersed surfactant will normally range between 10 to 1000 cubic feet, measured under reservoir conditions, per barrel of fracturing liquid injected into the formation. Generally an amount of approximately 10 to 100 cubic feet, measured under reservoir conditions, per barrel of fracturing liquid will suffice. Ordinarily, the field method of determining when a sufficient amount of gasiform fluid has been injected to generate the foam bank will be manifested by an increase in back pressure noted at the injection well as the foam bank builds up.

While ordinarily the foregoing method will suffice for the formation of foam in the earth where there are sufficient connate fluids, it is preferred to follow the fracturing fluid with a slug of aqueous liquid about equal to the volume of injected fracturing fluid, so as to move the surfactant pellets, spheres, grains or capsules away from the immediate area of the injection well, preferably to a distance of at least about 3 to 6% of the distance between the injection well and the production well, and/or to permit the dissolution of the water-soluble form of surfactant in the aqueous slug. Obviously, where an oil-soluble surfactant form is utilized a hydrocarbon slug will take the place of the aqueous slug. The injection of the aqueous slug or hydrocarbon slug, therefore, will serve not only to furnish the necessary liquid to permit foaming of the dissolved or dispersed surfactant where insufficient liquids are available in the reservoir but will also serve to displace and/or dissolve or disperse the surfactant away from the immediate injection well area. Those skilled in the art will of course recognize the fact that a distinct and independent aqueous or hydrocarbon slug will not be necessary where the terminal portion of the fracturing liquid is devoid of the surfactant constituent. That is, it is not necessary to inject an aqueous or hydrocarbon slug (which may or may not contain other additives) after the fracturing pressures have been decreased or released if the initial portion of the fracturing liquid contains the full complement of surfactant pellets, spheres, grains or capsules and the terminal portion does not contain foaming agent. Thus the surfactant-free terminal portion of the fracturing fluid will cause effective displacement of surfactant material away from the injection well area.

After the foam or foam banks have been formed in the formation the formation is then ready to receive the driving fluids which may comprise those driving fluids which have heretofore been proposed in the art such as natural gas, water, carbonated water, brine, combination fluids containing dissolved gases, flue gas and nitrogen and in some instances it may even be desirable to inject as a principal driving fluid one which contains an initial hydrocarbon-miscible component such as the oxygenated hydrocarbons, i.e., $C_3$–$C_{10}$ alcohols, aldehydes and ketones such as isoproply alcohol, methyl alcohol, and isopropyl ether. Where one of the oxygenated solvents forms the initial portion of the drive it is readily apparent that a miscible phase displacement process results which is preceded by a foam bank. The amount of driving fluids will normally comprise about 2 to 20 pore volumes with a general range of 5 to 10 pore volumes being sufficient to drive the foam bank through at least a major portion of the reservoir so as to effectively produce formation fluids and oil in the production well.

It is readily apparent that one need not resort to the independent gas slug injection subsequent to the fracturing fluid injection or aqueous slug or hydrocarbon slug displacement media if the principal driving fluid chosen is gasiform in nature. In that event the gas will contact the dissolved or dispersed surfactant to not only generate the foam bank but also to drive the foam bank through the reservoir towards the production well.

In carrying out the process of the invention, it is to be noted that any of the acceptable well pattern arrangements may be utilized. Thus, the five spot, seven spot and other conventional well patterns may be used and generally are preferable.

The advantages of the hereindisclosed invention can be readily comprehended in that foam is not formed within the immediate vicinity of the injection well whereby subsequent injection of fluids or a driving fluid such as either gas or a combination driving fluid such as gas and water is facilitated at lower pressures. Additionally, the formation of foam within the formation or reservoir preceding the principal driving fluid makes the recovery of additional oil possible because the generated foam tends to invade the larger capillaries or interstices of the formation thereby diverting the remainder of the foam and drive fluid into the smaller interstices or capillaries. In addition, a foam bank provides a more favorable drive fluid mobility ratio, improves conformance and the displacement efficiency and results in more complete displacement of oil from the subterranean formation. The displaced oil, connate water, foam and gas are recovered from the formation through the production well or wells and are separated from each other by conventional techniques well known in the art.

As a specific example of one embodiment of the invention, an oil-bearing subterranean reservoir has drilled therethrough a production well and injection well located about 440 feet apart. The injection well penetrates oil sand approximately 10 feet thick at a depth of about 3,000 feet. A fracturing liquid is prepared by mixing 40 mesh sand and Trepenol WA surfactant, which is in the form of 40 mesh spheres, with crude oil. The sand comprises 25% by wt. of the total solids content and the surfactant comprises the other 75%. The crude oil used to carry the mixture of sand and surfactant pellets and to cause fracturing is oil which has heretofore been previously recovered from the reservoir during primary recovery operations. The mixture of sand and foaming agent pellets is injected in the proportion of 1 pound per gallon of oil. One thousand gallons of oil containing 1,000 pounds of the mixture of sand and foaming agent are injected through the injection well and into the formation at a sand face pressure of 3,000 p.s.i. When the pressure has suddenly dropped, thereby indicating the fracturing of the formation, there is injected 1,000 gallons of water to displace and dissolve pelletted foaming agent away from the injection well bore area. Thereafter, natural gas at a rate of 250,000 standard cubic feet per day is injected until a back pressure of 1,000 p.s.i.g. is achieved. The desired back pressure, being indicative of the formation of a foam bank in the reservoir, signals the commencement of the injection of a driving fluid into the reservoir. Water is injected into the injection well and through the formation to move at least a major portion of the initially injected fluids or the bank of foam through the reservoir to the production well. Production of fluids from the production well is carried on until the water/oil ratio in produced fluids becomes economically unattractive at which time water injection into the injection well is terminated.

The embodiments of the invention in which an exclusive property or privilege is claimed are defined as follows:

1. In the combination process of fracturing and producing a subterranean oil-bearing formation penetrated by at least an injection well and a production well wherein the formation at least adjacent said injection well is fractured by the injection of fracturing liquids into said formation at fracturing pressures prior to the injection of driving fluids into said injection well and said driving fluids are then driven through said formation, the improvement which comprises mixing a surfactant with said fracturing liquid prior to its injection, said surfactant being in a form which will permit dispersion thereof in said formation a distance away from the immediate injection well bore vicinity and being capable upon dispersion of forming a tenacious foam under formation conditions when intimately contacted with a liquid and a gas, forming a foam in said formation and thereafter instituting the injection of said driving fluids and recovering oil-containing fluids from said production well.

2. The process in accordance with claim 1 wherein said surfactant is in the form of solidified pellets and is soluble in fluids contained in said formation.

3. The process in accordance with claim 2 wherein a slug of liquid in which said surfactant is soluble is injected after said fracturing liquid.

4. The process in accordance with claim 3 wherein said surfactant is in the form of solidified pellets insoluble in said fracturing liquid.

5. The process in accordance with claim 4 wherein said surfactant is water-soluble and said slug of liquid in which said surfactant is soluble is water.

6. The process in accordance with claim 3 wherein said surfactant is in encapsulated form.

7. The process in accordance with claim 6 wherein said foam is formed by injecting a gaseous driving fluid.

8. The process in accordance with claim 6 wherein said foam is formed by injecting a gas prior to the injection of liquids as said driving fluids.

9. The process in accordance with claim 8 wherein said fracturing liquid contains a propping agent.

10. The process in accordance with claim 9 wherein said fracturing liquid is petroleum derived, and at least the initial portion of said driving liquids is miscible with said fracturing liquid.

11. The method of recovering oil from subterranean oil-bearing formations penetrated by an injection well and a production well comprising the steps of:
  (a) injecting a fracturing liquid into said formation through said injection well at sufficient pressure to create fractures at least adjacent said injection well, said fracturing liquid comprising an oil-soluble carrier liquid, a propping agent and a surfactant in a form which will permit dispersion thereof in said formation a distance away from the injection well bore vicinity and being capable of forming a tenacious foam under formation conditions when intimately contacted with a liquid and a gas;
  (b) terminating injection of said fracturing liquid and contacting said surfactant with a gaseous fluid to substantially completely foam said surfactant;
  (c) injecting a driving fluid to drive the foam through at least a portion of said formation; and
  (d) recovering formation fluids from said production well.

12. The method in accordance with claim 11 wherein said carrier liquid is a high-boiling hydrocarbon, said surfactant is water-soluble, said propping agent is sand and said method includes the additional step of injecting a slug of aqueous liquid prior to the injection of said driving fluid.

13. The method in accordance with claim 12 wherein at least the initial portion of the driving fluid is gasiform.

14. The method in accordance with claim 13 wherein air comprises said initial portion of said driving fluid and water comprises the terminal portion.

15. The method of recovering oil from subterranean oil-bearing formations penetrated by an injection well and a production well comprising the steps of:
  (a) injecting into said injection well liquid hydrocarbon containing:
    (1) a water-soluble surfactant in solidified pellet form, said surfactant being capable of forming a tenacious foam under formation conditions when intimately contacted with a dissolving liquid and a gas, the surfactant being present in amounts effective to produce a foam bank in said formation when contacted by a liquid and a gas,
    (2) a propping agent, in an amount and under sufficient pressure to create fractures at least adjacent said injection well;
  (b) terminating injection of said liquid hydrocarbon;
  (c) injecting into said injection well a slug of aqueous liquid to contact said surfactant and to dissolve same;
  (d) injecting into said injection well an effective amount of gasiform fluid to contact said surfactant and generate a foam bank;
  (e) injecting into said injection well an effective amount of aqueous driving fluid to drive said foam bank through at least a portion of said formation; and
  (f) recovering formation fluids from said production well.

16. The method in accordance with claim 15 which additionally includes the step of injecting a quantity of liquid hydrocarbon and propping agent between steps (b) and (c) in a sufficient amount whereby the previously injected fluids are displaced from the injection well to a distance equal to about 3 to 6% of the distance between said injection well and said production well.

No references cited.

CHARLES E. O'CONNELL, *Primary Examiner.*

JAMES A. LEPPINK, *Examiner.*